(12) United States Patent
Wang et al.

(10) Patent No.: US 9,288,036 B2
(45) Date of Patent: *Mar. 15, 2016

(54) JOINT RETRANSMISSION AND FRAME SYNCHRONIZATION FOR ERROR RESILIENCE CONTROL

(71) Applicant: TangoMe, Inc., Mountain View, CA (US)

(72) Inventors: Yuanyuan Wang, Beijing (CN); Haim Vaisburd, Redwood City, CA (US); Yuxin Liu, Cupertino, CA (US); Shaowei Su, Beijing (CN); Yixin Yang, Beijing (CN)

(73) Assignee: TangoMe, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,978

(22) Filed: Feb. 12, 2015

(65) Prior Publication Data

US 2015/0156008 A1    Jun. 4, 2015

Related U.S. Application Data

(63) Continuation of application No. 13/736,822, filed on Jan. 8, 2013, now Pat. No. 9,019,992.

(51) Int. Cl.
*H04J 3/24* (2006.01)
*H04L 7/00* (2006.01)
*H04L 12/939* (2013.01)
*H04L 1/08* (2006.01)
(Continued)

(52) U.S. Cl.
CPC ........... *H04L 7/0016* (2013.01); *H04L 1/08* (2013.01); *H04L 1/1838* (2013.01); *H04L 1/1848* (2013.01); *H04L 49/55* (2013.01); *H04N 7/147* (2013.01)

(58) Field of Classification Search
None
See application file for complete search history.

(56) References Cited

U.S. PATENT DOCUMENTS

| 6,247,059 B1 | 6/2001 | Johnson et al. |
| 6,421,387 B1 | 7/2002 | Rhee |
| 7,234,000 B2 | 6/2007 | McEachern et al. |

(Continued)

FOREIGN PATENT DOCUMENTS

JP    2007-510363    4/2007

OTHER PUBLICATIONS

PCT/US2014/010555 International Search Report and Written Opinion, 9 pages.

*Primary Examiner* — Dang Ton
*Assistant Examiner* — Ronald H Davis (57) ABSTRACT

A method for controlling error resilience in network communication is described. The method includes: determining, by a receiver-side controller, a packet gap representing a packet loss of a packet being communicated over a network; projecting, by the receiver-side controller, a retransmission time-out for at least one missing packet of the packet loss; issuing, by the receiver-side controller, a retransmission request for the at least one missing packet; if the packet gap is not filled within a first time period of the retransmission time-out, then issuing, by the receiver-side controller, at least one synchronization frame request; and selecting, by a sender-side controller, to respond to at least one of either of the retransmission request or the at least one synchronization frame request and neither of the retransmission request nor the at least one synchronization frame request.

15 Claims, 9 Drawing Sheets

(51) Int. Cl.
*H04N 7/14* (2006.01)
*H04L 1/18* (2006.01)

(56) References Cited

U.S. PATENT DOCUMENTS

| | | |
|---|---|---|
| 7,574,531 B2 | 8/2009 | Bennett et al. |
| 7,843,830 B1 | 11/2010 | Subramanian et al. |
| 8,031,701 B2 | 10/2011 | Oran |
| 8,270,550 B2 | 9/2012 | Horn |
| 8,572,180 B2 | 10/2013 | Kern et al. |
| 8,572,382 B2 | 10/2013 | De Lutiis et al. |
| 8,681,854 B2 | 3/2014 | Leprovost et al. |
| 8,699,383 B2 | 4/2014 | Katis et al. |
| 9,019,992 B2 | 4/2015 | Su et al. |
| 2003/0154301 A1 | 8/2003 | McEachern et al. |
| 2006/0104279 A1 | 5/2006 | Fellman et al. |
| 2006/0133554 A1 | 6/2006 | Horn |
| 2007/0073822 A1* | 3/2007 | Bennett et al. ............... 709/206 |
| 2007/0110074 A1 | 5/2007 | Bradley et al. |
| 2009/0201990 A1 | 8/2009 | Leprovost et al. |
| 2009/0210707 A1 | 8/2009 | De Lutiis et al. |
| 2010/0235702 A1* | 9/2010 | Tanimoto et al. ............. 714/748 |
| 2013/0067091 A1 | 3/2013 | Kern et al. |

* cited by examiner

JOINT RETRANSMISSION AND FRAME SYNCHRONIZATION FOR ERROR RESILIENCE CONTROL

CROSS REFERENCE TO RELATED APPLICATIONS

This application is a continuation application of and claims the benefit of co-pending U.S. patent application Ser. No. 13/736,822 filed on Jan. 8, 2013 entitled "JOINT RETRANSMISSION AND FRAME SYNCHRONIZATION FOR ERROR RESILIENCE CONTROL" by Wang et al., and assigned to the assignee of the present application.

BACKGROUND

Generally, it is an objective during communication over a network via video to deliver video frames without any error corruption. Thus, error resilience is a much needed mechanism in video call applications that experience unavoidable errors.

DESCRIPTION OF EMBODIMENTS

The drawings referred to in this description should be understood as not being drawn to scale except if specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of an electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "determining", "projecting", "issuing", "selecting", "projecting", "continuing", "monitoring", "filtering", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As will be described below, embodiments provide a method for controlling error resilience in network communication by utilizing the combination of joint retransmission and enforced synchronized frame request strategies, while establishing time-out values.

Figure 1:
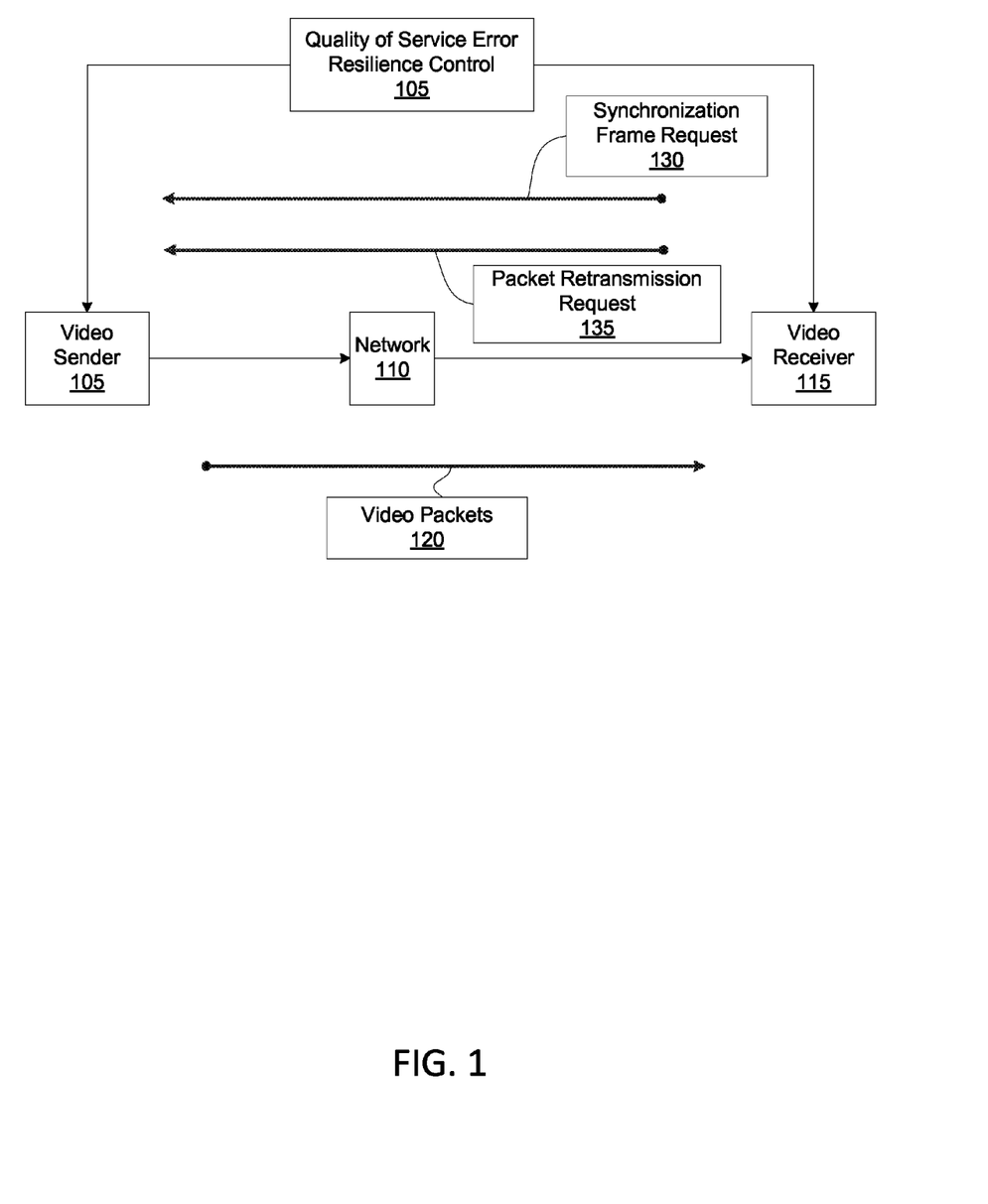
FIG. 1 illustrates an example of controlling joint retransmission and frame synchronization for error resilience, in accordance with an embodiment.
Figure 2A:
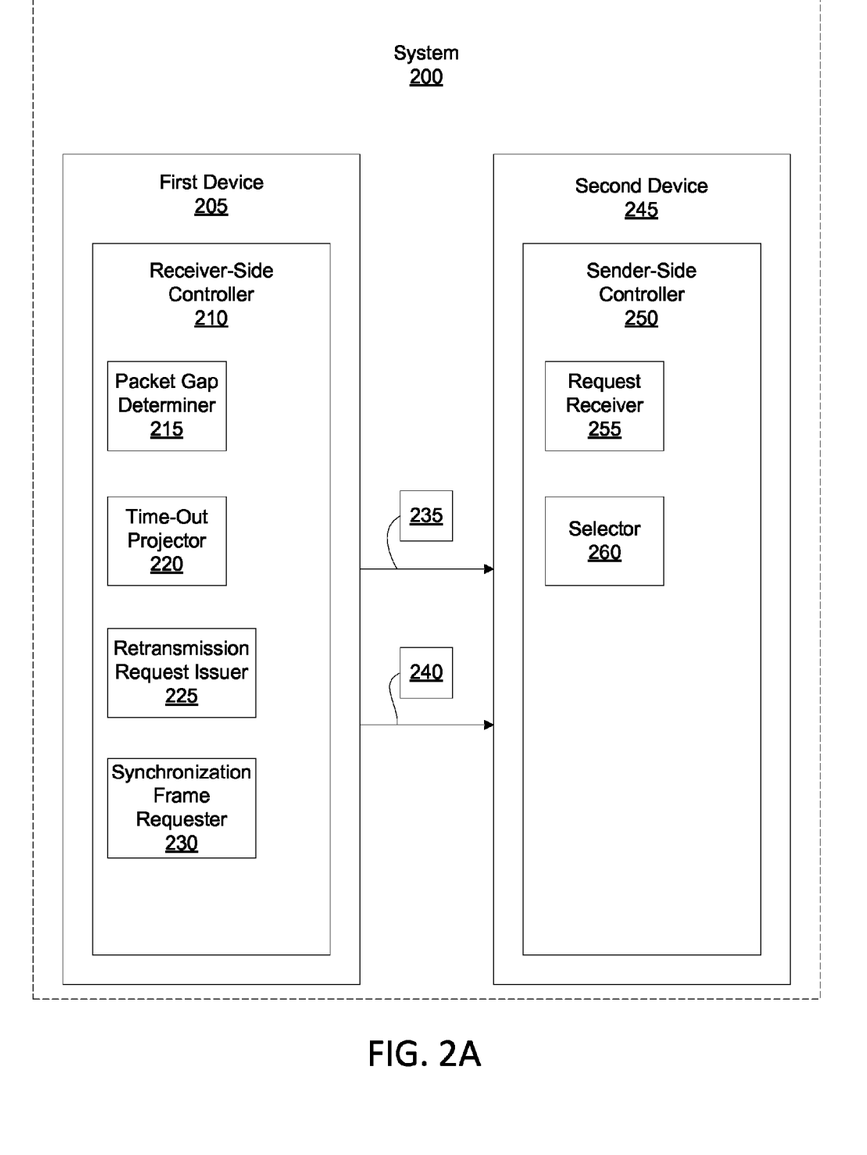
FIGS. 2A and 2B illustrate a device for controlling error resilience in network communication, in accordance with an embodiment.
Figure 2B:
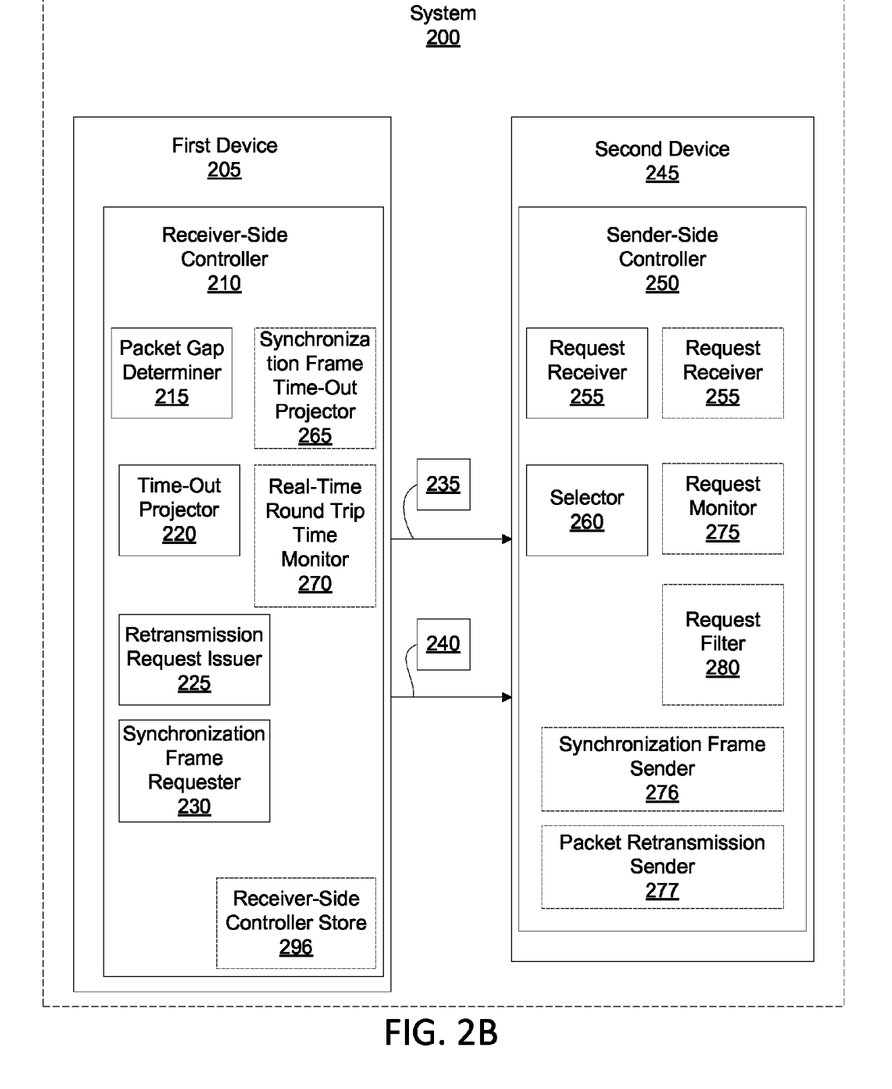

The following discussion will begin with a description of the current state of the art, and then move on to describe embodiments of the present technology in operation with reference to FIG. 1, and then discuss the structure and components of the system, as shown in FIGS. 2A and 2B. The discussion will continue with a description, in conjunction with the flow diagram of FIGS. 3A-3C, of the system in operation. The discussion will then turn to a description of various embodiments incorporated into example devices, as shown with reference to FIGS. 4, 5, and 6.

An objective of a video call is to achieve a fully successfully-received video frame of that video call without any error corruption, despite the unavoidable errors that occur. In so doing, one video frame may be packetized to one or more packets, depending on the encoded frame size. Outside of adopting an error protection scheme through forward error correction coding, traditionally, a packet may be retransmitted or a synchronization frame may be requested to stop error propagation and resume the video flow of the video call.

The synchronized frame may be either an IDR frame or a P frame that uses a reference that has already been received to its completeness at the receiver-side (i.e., a device receiving the synchronized frame), such as using a successfully received long term reference. In brief, in an MPEG video stream, and I Frame is a full frame. This I frame does not need any information from the frame before it or after it to be played back properly. An IDR frame is a special kind of I frame used in MPEG-4 AVC encoding. Frames following an IDR frame may not refer back to frames preceding the IDR frame. IDR frames can be used to create AVC streams which are more easily edited. In an MPEG video stream, a P-frame is not a full frame. Instead, it is a predictive video frame. This means that the P-frame follows an I-Frame and only stores the data that has changed from the preceding I Frame. IDR frames usually generate much larger frame sizes compared to the P frame. Hence, the use of a synchronized frame may incur large instant data flow injected into the network.

If only a small amount of video packets out of a large video frame get lost, the method of packet retransmission may be considered. However, packet retransmission will incur extra end-to-end delays. Thus, a challenge ensues in error resilience control in how to combine a packet retransmission and the enforced synchronized frame request. This is particularly evident when designing a strategy that must adapt to varying network conditions.

Embodiments provide for the joint control of two error resilience schemes, utilizing the novel design of setting up time-out values for the retransmission and the frame synchronization. Additionally, this joint control applies to both the receiver-side and the sender-side. Thus, embodiments provide a strategy that sets up timeout values while combining packet retransmission and enforced synchronized frame requests, applied to real-time media communication applications. Embodiments optimize the end-to-end delay and maximize the network bandwidth capability jointly and instantly. As noted, embodiments address both the receiver-side and the sender-side of the video call.

In brief, embodiments provide for determining a gap per video packet lost. (Of note, while the discussion addresses video in explaining embodiments, it should be appreciated that embodiments also may be applied to audio.) A timeout is then projected per missing video packet. A synchronization video frame is issued if the gap cannot be filled within a specified time by a retransmission of a video frame. In one embodiment, the sender combines the video frame retransmission request and the synchronization video frame request, and decides which one (or neither) to which to respond.

More specifically, the real-time round trip time is monitored and feedback is given to both the receiver-side and sender-side control components. Every packet gap at the receiver-side is identified by analyzing the packet consecutive sequence identification numbers.

Upon analysis, whenever the missing packet(s) gap length is smaller than a predefined threshold, all of the lost packets in the gap are required for a packet retransmission. Meanwhile, every retransmission packet is marked with a retransmission time-out constraint.

If a packet gap cannot be filled before the retransmission time-out (having been earlier specified), and there does not follow a synchronized frame received in fullness, a synchronized frame request will be issued. Every synchronized frame request is marked with an enforced synchronized frame time-out constraint. Further, every synchronized frame request is associated with the information regarding the most recently received frame timestamp.

If the synchronized frame (hereinafter and for the purpose of utilizing a video as an example, "synchronized video frame", unless otherwise noted) cannot be successfully received before the synchronized video frame time-out, another synchronized video frame request will be issued. These serial requests for another synchronized video frame will continue to be issued, upon the synchronized video frame time-outs being reached, until a successfully synchronized video frame is received or all of the video packet gaps are filled. Of note, whether a threshold has been reached regarding the synchronized video frame time-out is determined by the specified time-out value. The specified time-out value may be a value such that in one embodiment it must be reached to cause a continued synchronized video frame to be sent, while in another embodiment it must be exceeded to cause a continued synchronized video frame to be sent.

All the timeout values are determined by adapting to the instant network real-time round trip time values as well as by considering the corresponding packet gap lengths.

Of note, the sender-side control will monitor the packet retransmission request and the synchronized frame request and filter out unnecessary or duplicate requests.

FIG. 1 illustrates an example of performing a method for controlling error resilience in network communication using a joint retransmission and frame synchronization error resilience control, in accordance with an embodiment. The video sender 105 sends video packets 120 to the video receiver 115 over a network 110. The video packets 120 sent, in one embodiment, include, but are not limited to including, video packet consecutive sequence identification numbers. The video receiver 115 analyzes the video packets 120 that it receives and looks to see if the video packet consecutive sequence identification numbers that it expects to see are actually there. If the video receiver 115 discovers that the video packets 120 are not labeled in a consecutive manner, then the video receiver 115 identifies which video packet(s) are not there by determining the video packet identification number(s) that is missing. Thus, in this manner, the video receiver 115 has determined that an error in the transmission of the video packets 120 has occurred and has identified which video packets were not delivered. It should be appreciated that any pattern or identification means coupled with the video packets may be utilized, as long as this pattern or identification means has been communicated to the video receiver 115 in order that the video receiver 115 is able to analyze the video packets 120 received.

As part of the quality of service (QoS) error resilience control procedure 125 of embodiments, after the video receiver 115 determines the identity of the undelivered video packet(s) of the video packets 120, the video receiver 115 then requests of the video sender 105 a retransmission of the missing video packets (i.e., a packet retransmission request 135 is sent to the video sender 105 by the video receiver 115). Additionally, every retransmission packet is marked with a retransmission time-out constraint. In other words, a time-out value is assigned to (or projected to) each video packet requested to be retransmitted by the video sender 105 to the video receiver 115. The retransmission time-out value is a value representing a time period within which a retransmission must occur, the expiration of which time period triggers a request for at least one synchronization frame (e.g., the first frame synchronization request 130) to be issued to the video sender 105 by the video receiver 115. The retransmission time-out value (as well as the synchronization frame time-out value described below) may be any value that still accommodates a video chatting application. For example, the time-out values may be ½ second or even 100 milliseconds. However, in some instances, a video time-out of 1 second or longer would be too long, because such a time-out would seriously impede the video chat experience.

If the video packet gap (which needs to be filled with the missing video packet[s]) is not filled within the time period defined by the retransmission time-out value, the video receiver 115 issues at least one synchronization frame request 130 to the video sender 105, according to the QoS Error Resilience Control procedure 125 of embodiments. The first synchronization frame request 130 is also assigned a first synchronization frame time-out value. A synchronization frame time-out value is a value representing a synchronization frame time period within which a synchronization frame must be delivered, the expiration of which synchronization frame time period occurring without delivery of the synchronization frame triggers a subsequent request for the synchronization frame (having a second synchronization frame time-out value) to be issued to the video sender 105 by the video receiver 115. Thus, if the first synchronization frame time period within which the synchronization frame must be delivered expired without the video receiver 115 having received the synchronization frame, then a second synchronization frame request is issued to the video sender 105 by the video receiver 115. The second synchronization frame request is assigned a second synchronization frame time-out value, the expiration of which second synchronization frame time-out value occurring without delivery of the synchronization frame triggers a third request for the synchronization frame to be issued to the video sender 105 by the video receiver 115. This pattern of issuing subsequent synchronization frame requests to the video sender 105 by the video receiver 115 continues until a preprogrammed stoppage time and/or until a delivery of the full synchronization frame to the video receiver 115 occurs.

According to embodiments, the video sender 105 is enabled to make the following selections in response to receiving a packet retransmission request 135 and a synchronization frame request 130: select to retransmit a video packet(s), that was identified to be lost, to the video receiver 115; send a synchronization frame to the video receiver 115; and do nothing. These choices are obviated by the situation in which the video sender 105 may receive the packet retransmission request 135 later than the synchronization frame request 130, or may not receive the packet retransmission request 135 or the synchronization frame request 130 at all (e.g., due to a lossy network).

FIGS. 2A and 2B illustrate box diagrams of a system enabling joint retransmission and frame synchronization for error resilience control. FIGS. 2A and 2B depict embodiments of system 200. The system 200 includes at least a first device 205 and a second device 245. It should be appreciated that the system 200 may include more than just two devices (not shown). The first device 205 and second device 245 are configured for controlling error resilience in network communication. FIGS. 2A and 2B depicts first device 205 and second device 245 participating in a video conference. In general, video conferencing allows two or more locations to interact via multi-way video and audio transmissions simultaneously.

The discussion below will first describe the components of first device 205 and second device 245. The discussion will then describe the functionality of the components of first device 205 and second device 245 during a video conference between first device 205 and second device 245. First device 205 and second device 245 are any communication devices (e.g., laptop, desktop, smartphones, tablets, TV, etc.) capable of participating in a video conference. In various embodiments, first device 205 and second device 245 are a hand-held mobile device, such as smart phone, personal digital assistant (PDA), and the like. It should be appreciated that first device 205 and second device 245 may not be the same type of communication device. For example, first device 205 may be a hand-held mobile phone while second device 245 may be a tablet.

Moreover, for clarity and brevity, the discussion will focus on the components and functionality of first device 205 and second device 245 that are shown in FIGS. 2A and 2B. However, the device 245 operates in a similar fashion as the device 205. In one embodiment, the device 245 and the device 205 are the same and include the same components as each other, including both the receiver-side controller 210 and the sender-side controller 250, as will be described below.

In one embodiment, the first device 205 includes: a receiver-side controller 210. The receiver-side controller 210 includes: a packet gap determiner 215; a time-out projector 220; a retransmission request issuer 225; and synchronization frame requester 230. In various embodiments, the receiver-side controller 210 and/or the first device 205 optionally includes any of the following components: a synchronization frame time-out projector 265; a real-time round trip time monitor 270; and a receiver-side controller store 296.

In one embodiment, the second device 245 includes a sender-side controller 250. The sender-side controller 250 includes a request receiver 255; and a selector 260. In various embodiments, the sender-side controller 250 and/or the second device 245 optionally includes: a request monitor 275; a synchronization frame sender 276; a packet retransmission sender 277; a request filter 280; and a sender-side controller store 298.

In an embodiment, the packet gap determiner 215 determines a packet gap. The packet gap represents a packet loss of a packet being communicated over a network. In an embodiment, the time-out projector 220 projects a time-out for at least one missing packet of the packet loss. The retransmission request issuer 225 issues a retransmission request 235 for the at least one missing packet. If the packet gap is not filled within a time period, the synchronization frame requester issues at least one synchronization frame request 240. The synchronization frame time-out projector 265 projects the time-outs for the at least one synchronization frame request 240. The real-time round trip time monitor 270 monitors the retransmission request 235 and the at least one synchronization frame request 240.

The request receiver 255 receives the request (e.g., the retransmission request 235 and the at least one synchronization frame request 240) from the receiver-side controller 250. The selector 260 selectively responds to requests as follows: responds to the retransmission request 235; responds to the at least one synchronization frame request 240; and responds to neither the retransmission request 235 nor the synchronization frame request 240. The request monitor 275 monitors the retransmission request 235 and the at least one synchronization frame request 240. The synchronization frame sender 276 sends the at least one synchronization frame to the receiver-side controller 210. The packet retransmission sender 277 retransmits the at least one missing packet to the receiver-side controller 210.

The request filter 280 filters out duplicate requests.

Of note, both the first device 205 and/or the second device 245 optionally includes any of the following (as will be described herein): a display; a transmitter; a video camera; a microphone; a speaker; an instruction store; and a global positioning system.

Referring now to FIGS. 2A and 2B, first device 205 and second device 245 are in communication with one another, in accordance with an embodiment. For example, in various embodiments, more than two devices (including first device 205 and second device 245) participate in a video conference with each other.

Figure 3A:
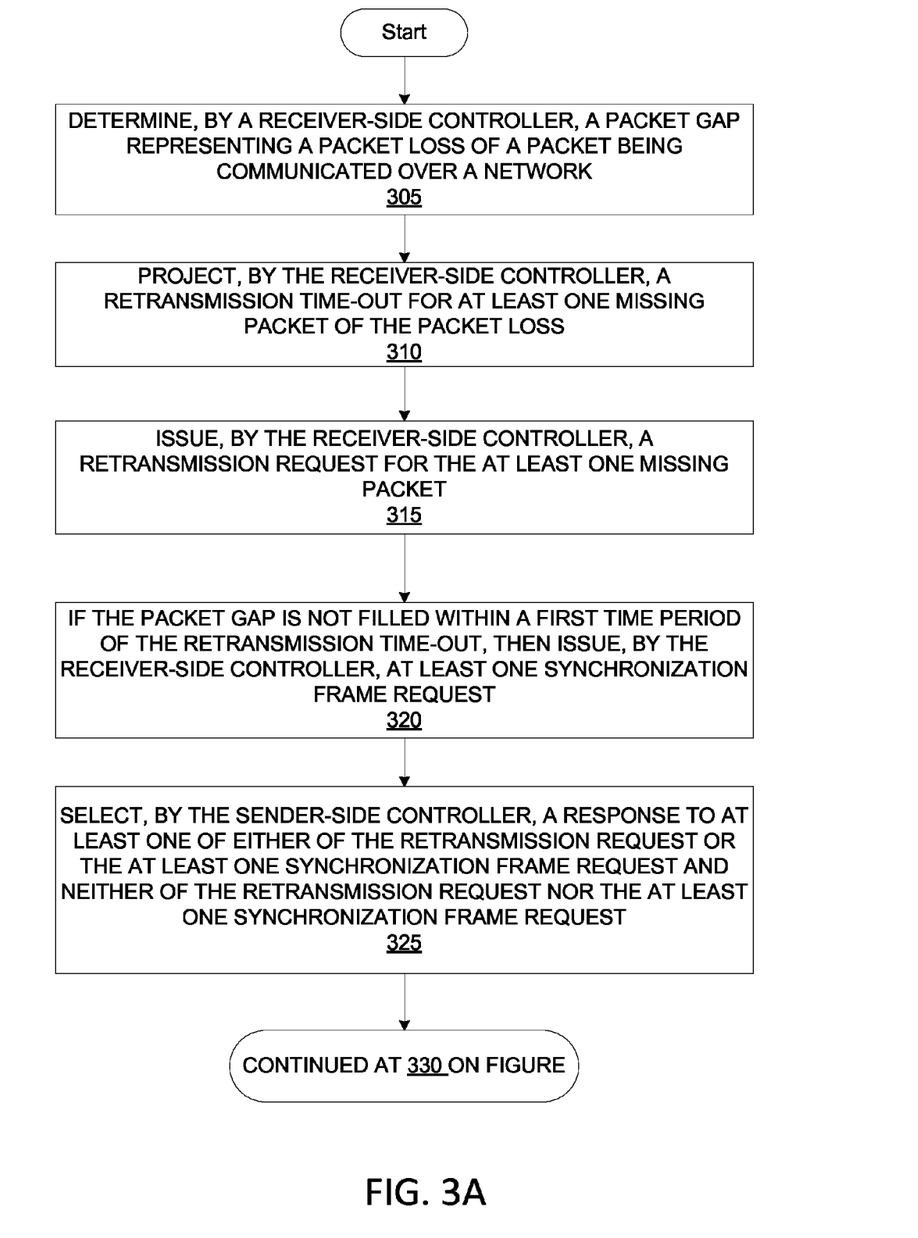
FIGS. 3A, 3B, and 3C are a flow diagram of a method for controlling error resilience in network communication, in accordance with an embodiment.
Figure 3B:
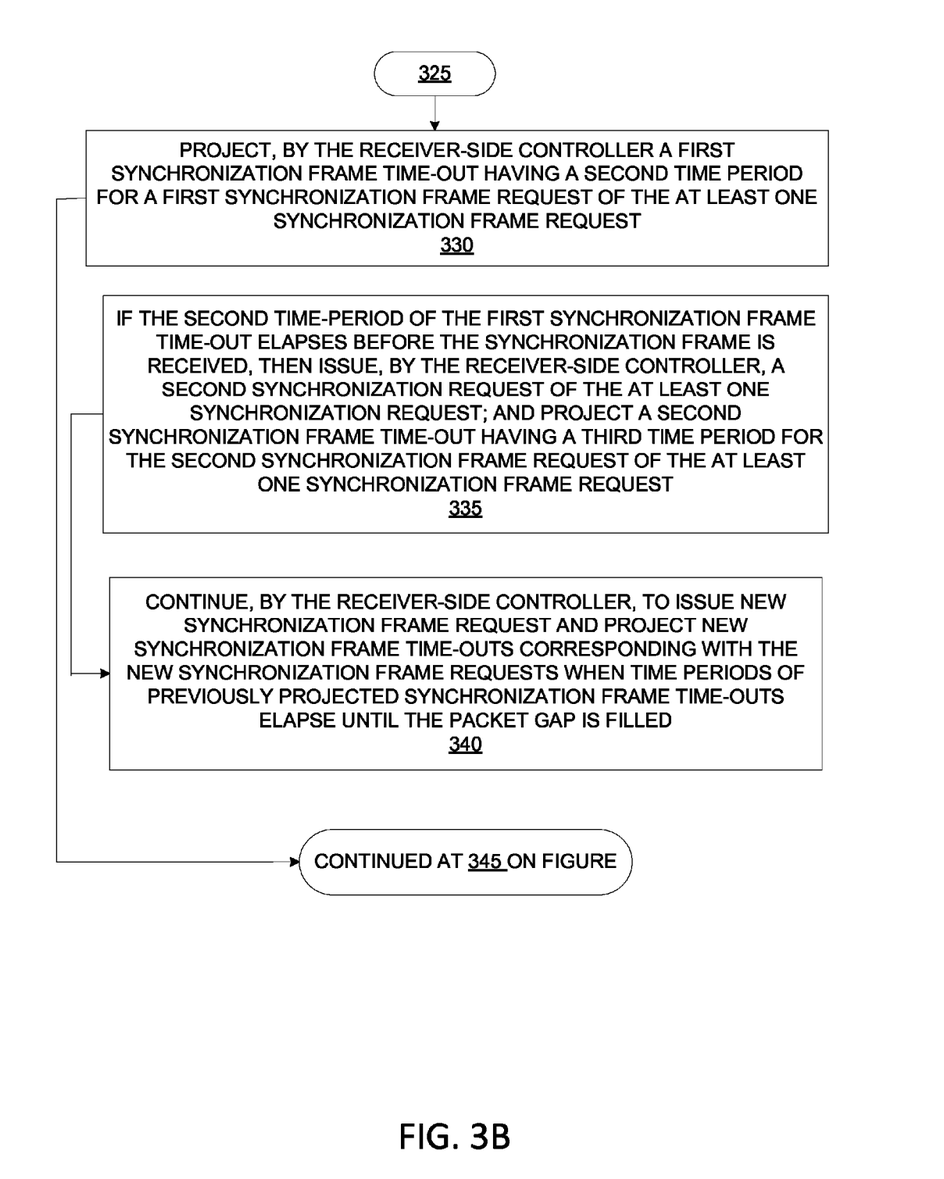
Figure 3C:
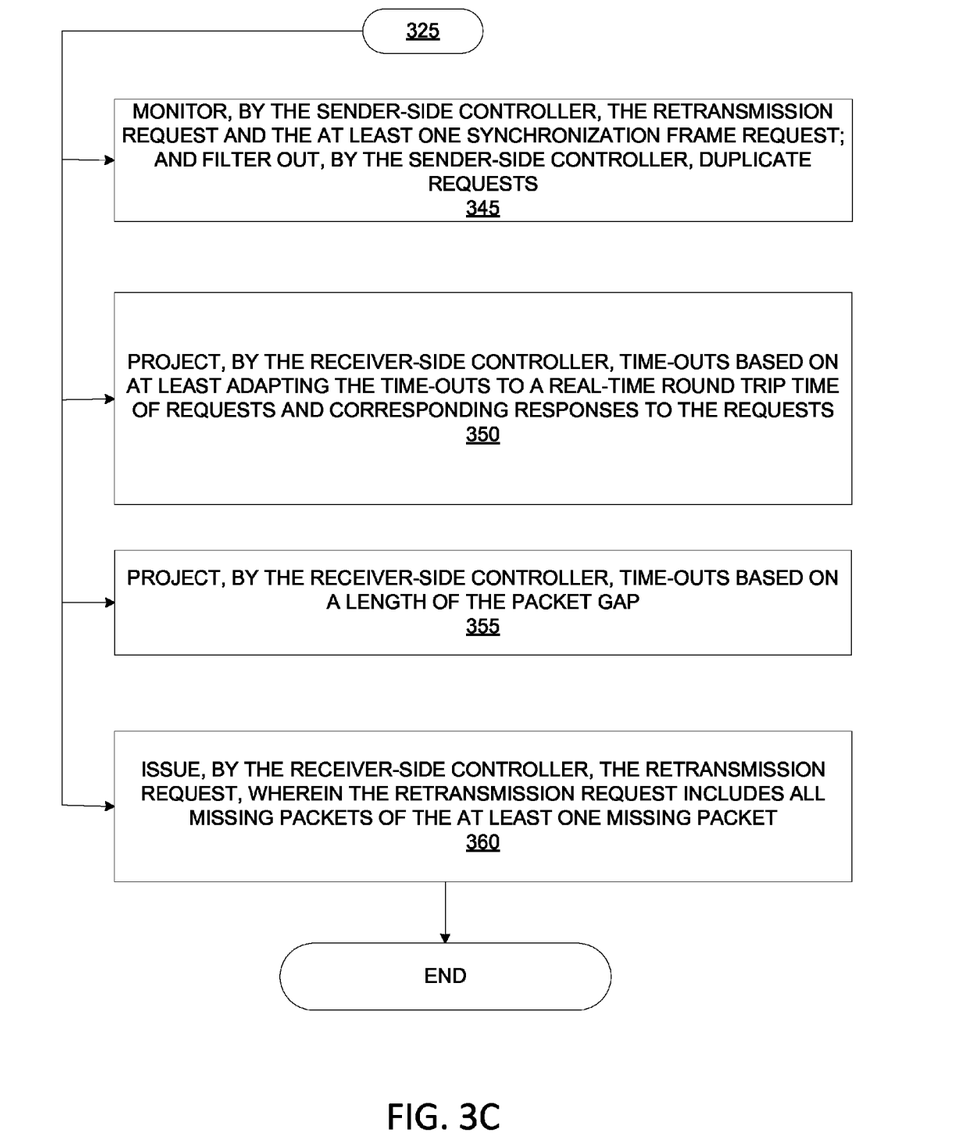

FIGS. 3A-3C depict a flow diagram 300 of a method for controlling error resilience in network communication, in accordance with an embodiment. In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed by system 200 and/or first device 205 and second device 245, and more particularly, by system receiver-side controller 210 and sender-side controller 250, as described in FIGS. 2A and 2B. It should be appreciated that the operations outlined in flow diagrams 3A-3C may be performed in any order, unless specifically stated otherwise.

With reference now to FIGS. 3A-3C, at operation 305 of method 300, in one embodiment and as described herein, a packet gap representing a packet loss of a packet being communicated over a network is determined by a receiver-side controller. At operation 310, in one embodiment and as discussed herein, a retransmission time-out for at least one missing packet of the packet loss is projected by the receiver-side controller. At operation 315, a retransmission request for the at least one missing packet is issued by the receiver-side controller. At operation 320, if the packet gap is not filled within a first time period of the retransmission time-out, then at least one synchronization frame request is issued by the receiver-side controller. At operation 325, in one embodiment and as described herein, a response to at least one of either of the retransmission request or the at least one synchronization frame request and neither of the retransmission request nor the at least one synchronization frame request is selected by a sender-side controller. In other words, at operation 325, embodiments provide for a selection of any of the following responses to be performed: a response to the retransmission request; a response to the at least one synchronization frame request; or no response to either the retransmission request and the at least one synchronization frame request.

At operation 330, in one embodiment and as described herein, a first synchronization frame time-out having a second time period for a first synchronization frame request of the at least one synchronization frame request is projected by the receiver-side controller. At operation 335, if the second time-period of the first synchronization frame time-out elapses before the synchronization frame is delivered, then a second synchronization request of the at least one synchronization request is issued by the receiver-side controller. In one embodiment and as described herein, embodiments continue to issue, by the receiver-side controller, new synchronization frame requests and project new synchronization frame time-outs corresponding with the new synchronization frame requests when time periods of previously projected synchronization frame time-outs elapse. This continued issuance of new synchronization frame requests and projections of new synchronization frame time-outs continue until the synchronization frame is received.

At operation 340, in one embodiment and as described herein, embodiments continue to issue new synchronization frame requests and project, by the receiver-side controller, new synchronization frame time-outs corresponding with the new synchronization frame requests when time periods of previously projected synchronization frame time-outs elapse until the packet gap is filled.

At operation 345, in one embodiment and as described herein, the retransmission request and the at least one synchronization frame request are monitored by the sender-side controller. Then, duplicate requests (e.g., retransmission requests and synchronization frame requests) are filtered out by the sender-side controller.

At operation 350, in one embodiment and as described herein, time-outs are projected by the receiver-side controller, based on at least adapting the time-outs to a real-time round trip time of requests (e.g., retransmission requests and synchronization frame requests) and corresponding responses to the requests.

At operation 355, in one embodiment and as described herein, time-outs are projected, by the receiver-side controller, based on a length of the packet gap. At operation 360, in one embodiment and as described herein, the retransmission request is issued by the receiver-side controller, wherein the retransmission request includes all missing packets of the at least one missing packet.

Thus, embodiments incorporate both the receiver-side and the sender-side of communication over a network, while optimizing the end-to-end delay during communication and maximizing the network bandwidth capability jointly and instantly.

In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed by devices 205 and/or device 245, as described in FIGS. 2A and 2B.

Figure 4:
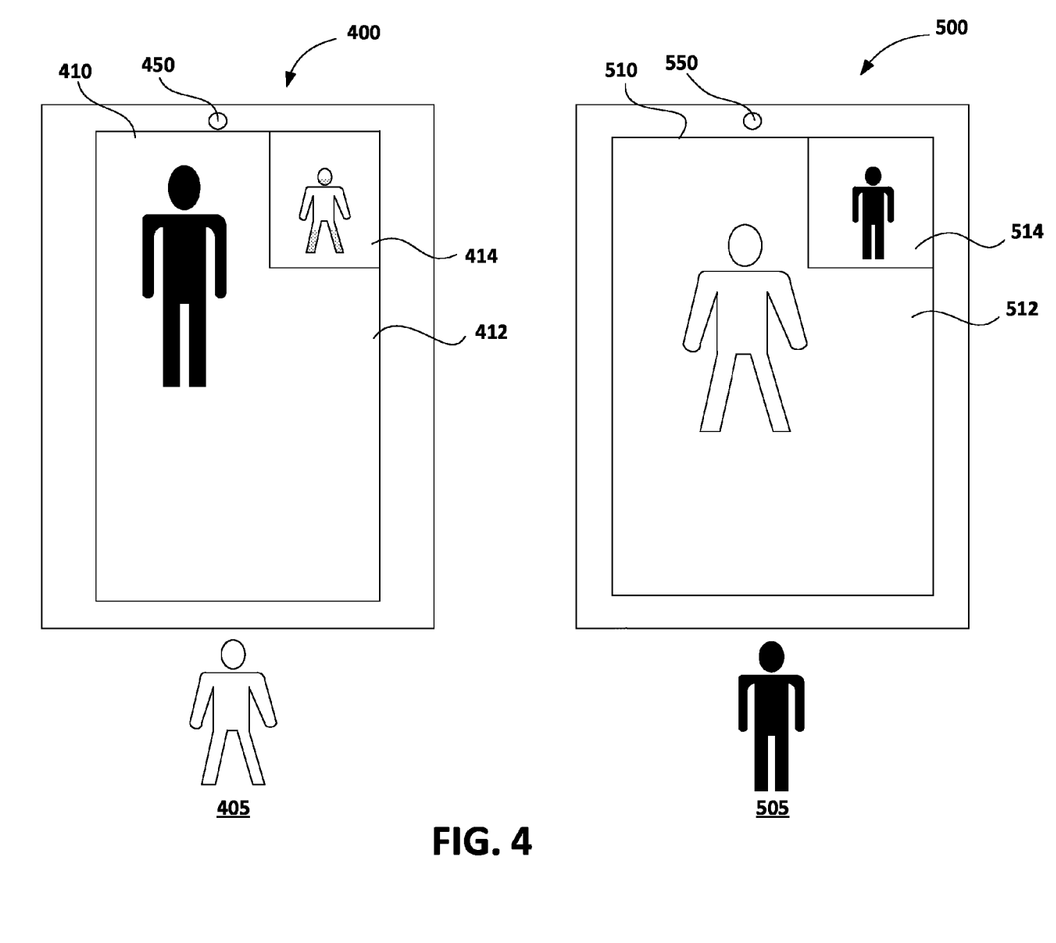
FIG. 4 illustrates example devices upon which embodiments for controlling error resilience in network communication operate, in accordance with an embodiment.
Figure 5:
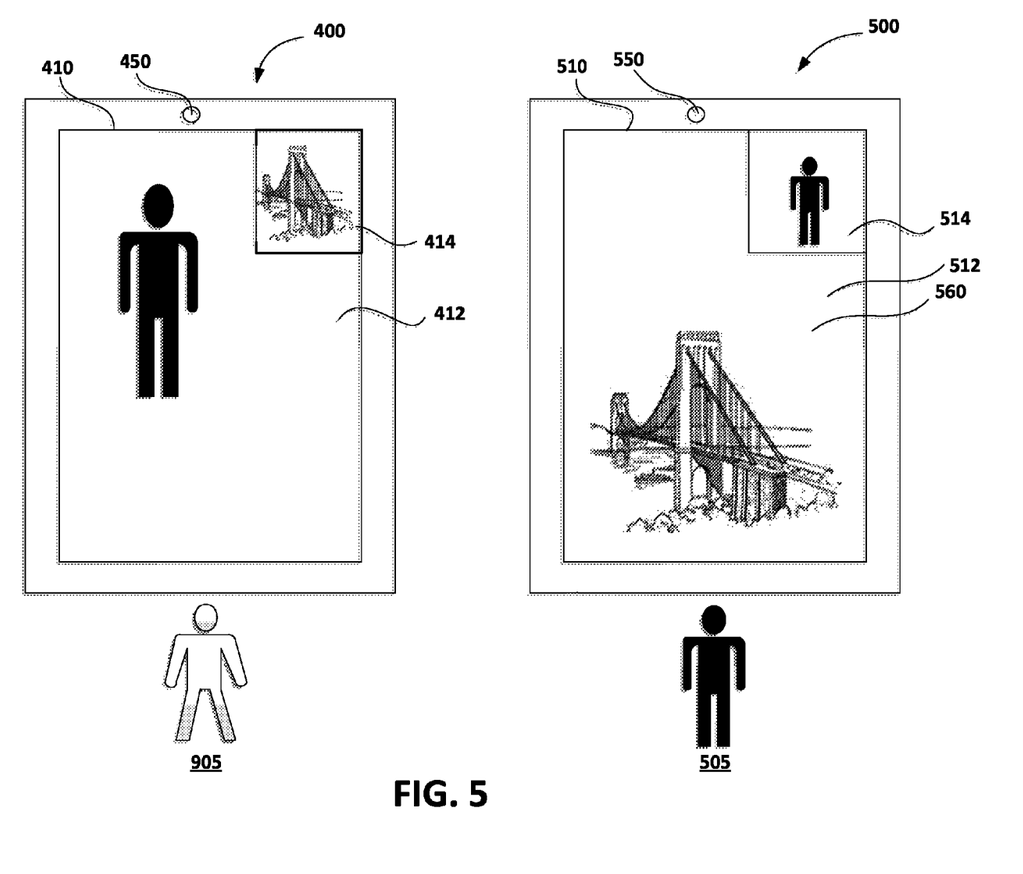
FIG. 5 illustrates example devices upon which embodiments for controlling error resilience in network communication operate, in accordance with an embodiment.

FIGS. 4 and 5 depict devices 400 and 500 participating in a video conference. In general, video conferencing allows two or more locations to interact via multi-way video and audio transmissions simultaneously.

Of note, in one embodiment, the first device 205 and/or the second device 245 include the components that are described as belonging to device 400 in FIG. 4. The functionality of the device 400 during a video conference between devices 400 and 500 is described below with reference to FIGS. 4 and 5.

Devices 400 and 500 are any communication devices (e.g., laptop, desktop, smartphones, tablets, TV, etc.) capable of participating in a video conference. In various embodiments, device 400 is a hand-held mobile device, such as smart phone, personal digital assistant (PDA), and the like.

For clarity and brevity, the discussion will focus on the components and functionality of device 400. However, device 500 operates in a similar fashion as device 400. In one embodiment, device 500 is the same as device 400 and includes the same components as device 400.

Figure 6:
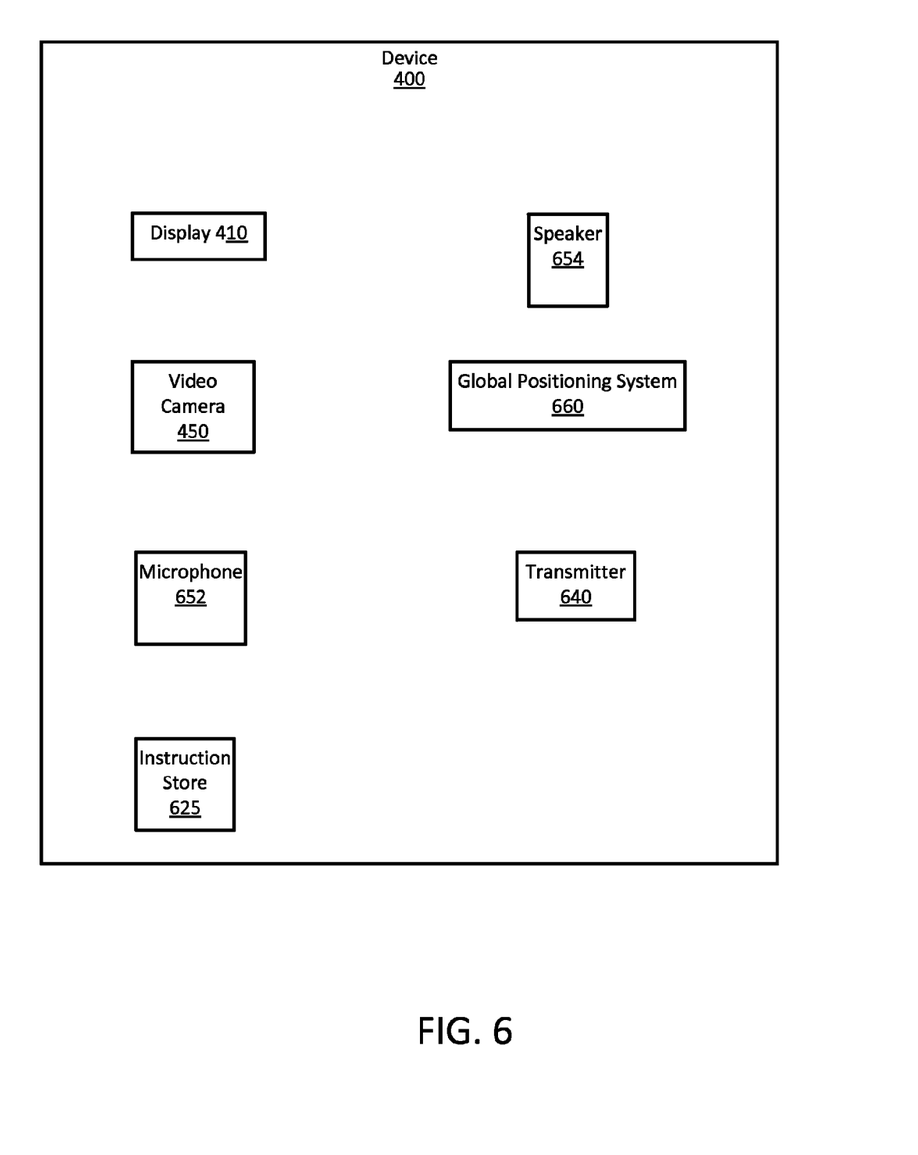
FIG. 6 illustrates a block diagram of an example device (e.g., mobile device) upon which embodiments for controlling error resilience in network communication operate, in accordance with an embodiment.

With reference now to FIGS. 4-6, in various embodiments, device 400 is variously coupled with any of the following, as described herein: receiver-side controller 210; and sender-side controller 250. Device 400 is coupled with, in various embodiments, any of the following components: a display 410; a transmitter 640; a video camera 450; a microphone 652; a speaker 654; an instruction store 625; and a global positioning system 660, as is illustrated in FIG. 6, which is a block diagram of various possible, but not limited to, components within the device 400, according to an embodiment.

Display 410 is configured for displaying video captured at device 400. In another embodiment, display 410 is further configured for displaying video captured at device 400.

Transmitter 640 is for transmitting data (e.g., control code).

The video camera 450 captures video at device 400. The microphone 452 captures audio at device 400. The speaker 454 generates an audible signal at device 400.

The global positioning system 460 determines a location of a device 400. In one embodiment, the instruction store 625 stores information associated with the joint retransmission and frame synchronization for error resilience control, such as, but not limited to any predefined thresholds, packet information (e.g., packet gap lengths, lost packets, packet identification numbers), assigned time-out values, real-time round trip times, and requests (e.g., retransmission requests, synchronized frame requests). In another embodiment, the receiver-side controller store 296 and/or the sender-side controller store 298 (in addition to or alternatively to the instruction store 625) stores information associated with the joint retransmission and frame synchronization for error resilience control, such as, but not limited to, any predefined thresholds, packet information (e.g., packet gap lengths, lost packets, packet identification numbers), assigned time-out values, real-time round trip times, and requests (e.g., retransmission requests, synchronized frame requests).

Referring now to FIGS. 4 and 5, devices 400 and 500 are participating in a video conference with one another, in accordance with an embodiment. In various embodiments, more than two devices participate in a video conference with each another.

During the video conference, video camera 550 captures video at device 500. For example, video camera 550 captures video of user 505 of device 500.

Video camera 450 captures video at device 400. For example, video camera 450 captures video of user 405. It should be appreciated that video cameras 450 and 550 can capture any objects that are within the respective viewing ranges of cameras 450 and 550. (See discussion below with reference to FIG. 5.)

A microphone (not shown) captures audio signals corresponding to the captured video signal at device 400. Similarly, a microphone (not shown) of device 500 captures audio signals corresponding to the captured video signal at device 500.

In one embodiment, the video captured at device 500 is transmitted to and displayed on display 410 of device 400. For example, a video of user 505 is displayed on a first view 412 of display 410. Moreover, the video of user 505 is displayed on a second view 514 of display 510.

The video captured at device 400 is transmitted to and displayed on display 510 of device 500. For example, a video of user 405 is displayed on first view 512 of display 510. Moreover, the video of user 405 is displayed on a second view 414 of display 410.

In one embodiment, the audio signals captured at devices 400 and 500 are incorporated into the captured video. In another embodiment, the audio signals are transmitted separate from the transmitted video.

As depicted, first view 412 is the primary view displayed on display 410 and second view 414 is the smaller secondary view displayed on display 410. In various embodiments, the size of both the first view 412 and the second view 414 are adjustable. For example, the second view 414 can be enlarged to be the primary view and the first view 412 can be diminished in size to be the secondary view (second view 414). Moreover, either one of views, first view 412 and second view 414 can be closed or fully diminished such that it is not viewable.

With reference now to FIG. 5, the user 505 of device 500 is capturing the image of a bridge 560 (instead of capturing an image of himself/herself 505), which is within the viewing range of video camera 550. The image of the bridge 560 is depicted at second view 414 of device 400, and at a first view 512 of device 500.

All statements herein reciting principles, aspects, and embodiments of the technology as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present technology, therefore, is not intended to be limited to the embodiments shown and described herein. Rather, the scope and spirit of present technology is embodied by the appended claims.

The invention claimed is:

1. A non-transitory computer readable storage medium having stored thereon, computer-executable instructions that, when executed by a computer, cause said computer to perform a method for controlling error resilience in network communication, wherein said method comprises:
   determining, by a receiver-side controller, a packet gap representing a packet loss of a packet being communicated over a network;
   projecting, by said receiver-side controller, a retransmission time-out for at least one missing packet of said packet loss;
   issuing, by said receiver-side controller, a retransmission request for said at least one missing packet; and
   if said packet gap is not filled within a first time period of said retransmission time-out, then issuing, by said receiver-side controller, at least one synchronization frame request.

2. The non-transitory computer readable storage medium of claim 1, further comprising:
   projecting, by said receiver-side controller, a first synchronization frame time-out having a second time-period for a first synchronization frame request of said at least one synchronization frame request.

3. The non-transitory computer readable storage medium of claim 2, further comprising:
   if said second time-period of said first synchronization frame time-out elapses before said synchronization frame is received, then issuing, by said receiver-side controller, a second synchronization frame request of said at least one synchronization request; and
   projecting, by said receiver-side controller, a second synchronization frame time-out having a third time period for said second synchronization frame request of said at least one synchronization frame request.

4. The non-transitory computer readable storage medium of claim 3, further comprising:
   continuing, by said receiver-side controller, to issue new synchronization frame requests and projecting new synchronization frame time-outs corresponding with said new synchronization frame requests when time periods of previously projected synchronization frame time-outs elapse until said packet gap is filled.

5. The non-transitory computer readable storage medium of claim 1, further comprising:
   monitoring, by said sender-side controller, said retransmission request and said at least one synchronization frame request; and
   filtering out, by said sender-side controller, duplicate requests.

6. The non-transitory computer readable storage medium of claim 1, further comprising:
   projecting, by said receiver-side controller, time-outs based on at least adapting said time-outs to a real-time round trip time of requests and corresponding responses to said requests.

7. The non-transitory computer readable storage medium of claim 1, further comprising:
   projecting, by said receiver-side controller, time-outs based on a length of said packet gap.

8. The non-transitory computer readable storage medium of claim 1, wherein said issuing, by the receiver-side controller, a retransmission request for said at least one missing packet comprises:

issuing, by the receiver-side controller, said retransmission request, wherein said retransmission request includes all missing packets of said at least one missing packet.

9. A system for controlling error resilience in network communication, wherein said system comprises:
   a first device comprising a receiver-side controller, said receiver-side controller comprising: a packet gap determiner configured for determining a packet gap representing a packet loss of a packet being communicated over a network;
   a time-out projector configured for projecting a retransmission time-out for at least one missing packet of said packet loss;
   a retransmission request issuer configured for issuing a retransmission request for said at least one missing packet;
   a synchronization frame requester configured for, if said packet gap is not filled within a first time period of a retransmission time-out, then issuing at least one synchronization frame request;
   a synchronization frame time-out projector configured for projecting time-outs for said at least one synchronization frame request; and
   a second device comprising a sender-side controller coupled with said receiver-side controller, said sender-side controller comprising:
   a request receiver configured for receiving requests from said receiver-side controller.

10. The system of claim 9, wherein said sender-side controller further comprises:
   a request monitor configured for monitoring said retransmission request and said at least one synchronization frame request.

11. The system of claim 10, wherein said sender-side controller further comprises:
   a request filter configured for filtering out duplicate requests.

12. The system of claim 9, wherein said receiver-side controller further comprises:
   a real-time round trip time monitor configured for monitoring a real-time round trip time of said requests and corresponding responses to said requests.

13. The system of claim 9, wherein said sender-side controller further comprises:
   a synchronization frame sender configured for sending at least one synchronization frame to said receiver-side controller.

14. The system of claim 9, wherein said sender-side controller further comprises:
   a packet retransmission sender configured for retransmitting said at least one missing packet to said receiver-side controller.

15. The device of claim 9, wherein said retransmission request comprises:
   all missing packets of said at least one missing packet.

* * * * *